United States Patent
Brown et al.

[11] Patent Number: 6,100,208
[45] Date of Patent: Aug. 8, 2000

[54] OUTDOOR FABRIC

[75] Inventors: Trina Buce Brown, Woodstock, Ga.; Robert Leslie Hudson, Los Vegas, Nev.; Mary Lucille DeLucia, Roswell, Ga.

[73] Assignee: Kimberly-Clark Worldwide, Inc., Neenah, Wis.

[21] Appl. No.: 08/999,911

[22] Filed: Oct. 14, 1997

Related U.S. Application Data

[60] Provisional application No. 60/030,532, Oct. 31, 1996.

[51] Int. Cl.⁷ .................................................. D04H 1/06
[52] U.S. Cl. ........................ 442/364; 428/373; 442/76; 442/361; 442/362; 442/363; 442/345; 442/389; 442/394; 442/395; 442/396; 442/398; 442/399
[58] Field of Search .......................... 428/373; 442/361, 442/76, 362, 363, 345, 364, 389, 394, 395, 396, 398, 399

[56] References Cited

U.S. PATENT DOCUMENTS

| | | | |
|---|---|---|---|
| 3,499,822 | 3/1970 | Ole et al. | 428/293 |
| 3,595,731 | 7/1971 | Davies et al. | 161/150 |
| 3,616,149 | 10/1971 | Wincklhofer | 161/89 |

(List continued on next page.)

FOREIGN PATENT DOCUMENTS

| | | |
|---|---|---|
| 2053831 | 6/1992 | Canada . |
| 0 366 470 | 5/1990 | European Pat. Off. . |
| 0 490 476 | 6/1992 | European Pat. Off. . |
| 0 604 731 | 7/1994 | European Pat. Off. . |
| 0738505 | 10/1996 | European Pat. Off. . |
| 19543954 | 5/1997 | Germany . |
| 55-067053 | 5/1980 | Japan . |
| 5-000489 | 1/1993 | Japan . |
| 5-124144 | 5/1993 | Japan . |
| 2121423 | 12/1983 | United Kingdom . |
| 96/19346 | 6/1996 | WIPO . |
| 96/25548 | 8/1996 | WIPO . |
| 97/21335 | 6/1997 | WIPO . |
| 97/34037 | 9/1997 | WIPO . |

OTHER PUBLICATIONS

Japanese Abstract of 03 045–713–A.
Japanese Abstract of 02 127–520–A.
Japanese Abstract of 02–112–415–A.
Japanese Abstract of 01–221–514–A.
Japanese Abstract of 62–097–918–A.
Japanese Abstract of 63–243–324–A.
Japanese Abstract of 02–014–018–A.
Japanese Abstract of 44–024–508–A.
Japanese Abstract of 03–287–818–A.
Japanese Abstract of 03–241–055–A.
Japanese Abstract of 03–241–054–A.
Japanese Abstract of 03–137–223–A.
Japanese Abstract of 02–191–716–A.
German Abstract 2–810–429.
Soviet Union Abstract, 533612, Nov. 18, 1976.
Japanese Abstract, 6116–732, Sep. 12, 1981.
Japanese Abstract, 6127–646, Oct. 6, 1981.
European Abstract, 72–550, Feb. 23, 1983.
Japanese Abstract, 1055–103, Mar. 19, 1986.
Japanese Abstract, 61–155–435, Jul. 15, 1986.
Japanese Abstract, 2133–107, Jun. 16, 1987.
Japanese Abstract, 2215–848, Aug. 28, 1990.
Japanese Abstract, 3241–012, Oct. 28, 1991.
Japanese Abstract 04–071837, Mar. 6, 1992.
Japanese Abstract, 4–214709, Aug. 5, 1992.
Japanese Abstract, 4–327211, Nov. 16, 1992.
Japanese Abstract 09–137353, May 27, 1997.
Research Disclosure 19509.

*Primary Examiner*—Terrel Morris
*Assistant Examiner*—Arti R. Singh
*Attorney, Agent, or Firm*—Douglas H. Tulley

[57] ABSTRACT

An outdoor protective fabric is disclosed having (i) a UV stable outer nonwoven web of multicomponent sheath/core fibers having a polyethylene polymer sheath component and a polypropylene polymer core component; (ii) a breathable barrier layer such as a meltblown web or microporous film; and (iii) an interior nonwoven web of multicomponent fibers comprising a polyethyfene polymer component and a nylon component.

24 Claims, 3 Drawing Sheets

U.S. PATENT DOCUMENTS

| | | | |
|---|---|---|---|
| 3,622,428 | 11/1971 | Robinson | 161/59 |
| 3,760,046 | 9/1973 | Schwartz et al. | 264/47 |
| 3,929,939 | 12/1975 | Salyer et al. | 260/897 |
| 3,932,682 | 1/1976 | Loft et al. | 428/296 |
| 4,034,138 | 7/1977 | Babayan | 428/378 |
| 4,041,203 | 8/1977 | Brock et al. | 428/157 |
| 4,096,115 | 6/1978 | Irick, Jr. et al. | 260/45.8 |
| 4,194,041 | 3/1980 | Gore et al. | 428/315 |
| 4,211,692 | 7/1980 | Barkis et al. | 260/45.7 P |
| 4,211,816 | 7/1980 | Booker et al. | 428/296 |
| 4,211,819 | 7/1980 | Kunimune et al. | 428/374 |
| 4,234,655 | 11/1980 | Kunimune et al. | 428/374 |
| 4,285,748 | 8/1981 | Booker et al. | 156/167 |
| 4,315,881 | 2/1982 | Nakajima et al. | 264/171 |
| 4,374,888 | 2/1983 | Bornslaeger | 428/198 |
| 4,399,265 | 8/1983 | Garware et al. | 528/308.2 |
| 4,424,257 | 1/1984 | Bach | 428/370 |
| 4,487,870 | 12/1984 | Bartz | 524/91 |
| 4,500,384 | 2/1985 | Tomioka et al. | 156/290 |
| 4,501,856 | 2/1985 | Harpell et al. | 525/240 |
| 4,503,180 | 3/1985 | Ching | 524/293 |
| 4,508,113 | 4/1985 | Malaney | 128/132 |
| 4,522,203 | 6/1985 | Mays | 128/132 |
| 4,522,868 | 6/1985 | Ohuchi et al. | 428/224 |
| 4,555,811 | 12/1985 | Shimalla | 2/51 |
| 4,563,392 | 1/1986 | Harpell et al. | 428/394 |
| 4,584,347 | 4/1986 | Harpell et al. | 525/119 |
| 4,595,629 | 6/1986 | Mays | 442/364 |
| 4,684,570 | 8/1987 | Malaney | 442/389 |
| 4,705,717 | 11/1987 | Cain et al. | 428/252 |
| 4,725,481 | 2/1988 | Ostapchenko | 428/213 |
| 4,732,809 | 3/1988 | Harris, Jr. et al. | 428/373 |
| 4,739,025 | 4/1988 | Burch | 526/348 |
| 4,744,124 | 5/1988 | Shimalla et al. | 428/171 |
| 4,770,905 | 9/1988 | Silbermann et al. | 427/160 |
| 4,777,073 | 10/1988 | Sheth | 428/155 |
| 4,778,717 | 10/1988 | Fitchumun | 428/246 |
| 4,789,592 | 12/1988 | Taniguchi et al. | 428/373 |
| 4,816,328 | 3/1989 | Saville et al. | 428/246 |
| 4,818,585 | 4/1989 | Shipp, Jr. | 428/198 |
| 4,847,142 | 7/1989 | Twilley et al. | 428/252 |
| 4,868,246 | 9/1989 | MacLeay et al. | 525/142 |
| 4,929,303 | 5/1990 | Sheth | 156/209 |
| 4,950,541 | 8/1990 | Tabor et al. | 428/373 |
| 4,963,607 | 10/1990 | Reilly et al. | 524/291 |
| 4,983,450 | 1/1991 | Yanagihara et al. | 428/283 |
| 4,990,204 | 2/1991 | Krupp et al. | 156/167 |
| 4,999,064 | 3/1991 | Knaepen | 156/62.2 |
| 5,036,551 | 8/1991 | Dailey et al. | 2/167 |
| 5,043,209 | 8/1991 | Boisse et al. | 428/233 |
| 5,051,458 | 9/1991 | Costanzi et al. | 524/99 |
| 5,070,124 | 12/1991 | Bohen et al. | 524/151 |
| 5,071,705 | 12/1991 | Tanaka et al. | 428/370 |
| 5,082,899 | 1/1992 | Sawyer et al. | 525/74 |
| 5,091,213 | 2/1992 | Silbermann et al. | 427/160 |
| 5,108,820 | 4/1992 | Kaneko et al. | 428/198 |
| 5,108,827 | 4/1992 | Gessner | 428/219 |
| 5,112,686 | 5/1992 | Krupp et al. | 428/401 |
| 5,122,555 | 6/1992 | Scott et al. | 524/99 |
| 5,126,199 | 6/1992 | Sawyer et al. | 428/359 |
| 5,167,764 | 12/1992 | Nielsen et al. | 162/146 |
| 5,167,765 | 12/1992 | Nielsen et al. | 162/146 |
| 5,169,712 | 12/1992 | Tapp | 428/315.5 |
| 5,185,199 | 2/1993 | Sawyer et al. | 428/288 |
| 5,208,098 | 5/1993 | Stover | 428/284 |
| 5,254,378 | 10/1993 | Krueger et al. | 428/34.1 |
| 5,266,390 | 11/1993 | Garland | 428/216 |
| 5,266,616 | 11/1993 | Wolfe | 524/94 |
| 5,272,003 | 12/1993 | Peacock | 428/357 |
| 5,277,974 | 1/1994 | Kubo et al. | 428/373 |
| 5,306,548 | 4/1994 | Zabrocki et al. | 428/215 |
| 5,372,885 | 12/1994 | Tabor et al. | 428/373 |
| 5,382,400 | 1/1995 | Pike et al. | 264/168 |
| 5,382,461 | 1/1995 | Wu | 428/86 |
| 5,393,599 | 2/1995 | Quantrille et al. | 428/284 |
| 5,409,761 | 4/1995 | Langley | 428/198 |
| 5,413,849 | 5/1995 | Austin et al. | 428/293 |
| 5,424,115 | 6/1995 | Stokes | 428/198 |
| 5,431,991 | 7/1995 | Quantrille et al. | 428/109 |
| 5,460,884 | 10/1995 | Kobylivker et al. | 428/373 |
| 5,464,688 | 11/1995 | Timmons et al. | 428/298 |
| 5,470,640 | 11/1995 | Modrak | 428/171 |
| 5,484,645 | 1/1996 | Lickfield et al. | 428/198 |
| 5,498,468 | 3/1996 | Blaney | 428/198 |
| 5,503,907 | 4/1996 | Gessner et al. | 428/198 |
| 5,534,339 | 7/1996 | Stokes | 428/284 |
| 5,536,555 | 7/1996 | Zelazoski et al. | 428/138 |
| 5,540,976 | 7/1996 | Shawver et al. | 428/198 |
| 5,540,992 | 7/1996 | Marcher et al. | 428/373 |
| 5,545,464 | 8/1996 | Stokes | 428/198 |
| 5,560,974 | 10/1996 | Langley | 428/198 |
| 5,567,501 | 10/1996 | Srinivasan et al. | 428/137 |
| 5,573,841 | 11/1996 | Adam et al. | 428/219 |
| 5,585,161 | 12/1996 | Difloe et al. | 428/109 |
| 5,605,739 | 2/1997 | Stokes et al. | 428/198 |
| 5,662,978 | 9/1997 | Brown et al. | 428/57 |
| 5,695,868 | 12/1997 | McCormack | 428/283 |
| 5,711,994 | 1/1998 | Powers | 427/255.6 |
| 5,714,256 | 2/1998 | DeLucia et al. | 428/373 |
| 5,762,734 | 6/1998 | DeLucia et al. | 156/73.2 |
| 5,766,737 | 6/1998 | Willey et al. | 428/198 |
| 5,858,515 | 1/1999 | Stokes et al. | 428/195 |
| 5,882,769 | 3/1999 | McCormack et al. | 428/152 |

OUTDOOR FABRIC

This application claims priority from U.S. Provisional application Ser. No. 60/030,532 filed on Oct. 31, 1996.

FIELD OF THE INVENTION

The present invention generally relates to recreational and outdoor fabrics. More particularly, the present invention relates to nonwoven laminates for recreational and outdoor fabrics.

BACKGROUND OF THE INVENTION

Significant exposure to sun and bad weather can seriously degrade the appearance of many products such as, for example, by causing colors to fade, paint or other coatings to peel and blister, oxidation (i.e. rust) and the like. Further, the appearance of many products, automobiles in particular, may be tarnished from exposure to other hazards such as tree sap, leaves, bird droppings, etc. Moreover, in addition to degrading the appearance, extended outdoor exposure can significantly shorten the life span of many products. Thus, products which are subjected to lengthy outdoor exposure are commonly fitted with protective covers designed to limit the adverse effects of such exposure. Similarly, human exposure to extended sun and/or bad weather can be unpleasant and, if for significant durations, potentially hazardous to one's health. Thus, outdoor fabric which provide some means of protection from the environment are often utilized in products such as tarpaulins, tents, and in outdoor or weatherproof apparel and the like.

Outdoor fabrics typically require sufficient strength to resist tears, rips and puncture. These fabrics commonly act as a barrier to water thereby providing protection from rain and other forms of precipitation. In this regard, some fabrics have the ability to act as a barrier to water in the liquid state while at the same time remain "breathable" in the sense that water vapor may pass through the fabric. Breathable materials are often preferred in many products such as, for example, in an automobile cover since a breathable cover helps prevent the build-up of moisture beneath the cover and adjacent to the automobile's surface. Breathable fabrics are likewise preferred in outdoor apparel since breathable fabrics are more comfortable to wear than similar non-breathable apparel. However, as the level of breathability increases often the barrier properties of the fabric decreases. Thus, many breathable fabrics fail to provide sufficient barrier properties and are prone to leak when subjected to intense rain or other harsh conditions. Further, outdoor fabrics also provide protection from the effects of sunlight, particularly from the ultraviolet (UV) radiation and heat that accompanies the same. Although it is expected that outdoor fabrics will gradually lose the desired strength and barrier properties over time, they too are susceptible to premature degradation as a result of extended exposure to intense sunlight.

Outdoor nonwoven fabrics provide multiple forms of protection from outdoor exposure and are expected to do so over extended periods of time. However, the effects of outdoor exposure are such that even protective fabrics specifically intended for outdoor use may lose their desired properties and appearance prematurely. Accordingly, there exists a continuing need for outdoor fabrics which are capable of providing protection from the adverse effects associated with extended exposure to the sun and bad weather. There further exists a need for an outdoor fabric which provides excellent water barrier properties and yet which also provides good breathability. Moreover, there exists a need for such fabrics which are durable and capable of retaining desired properties, such as strength or barrier properties, when subjected to the rigors of extended outdoor exposure.

SUMMARY OF THE INVENTION

The aforesaid needs are fulfilled and the problems experienced by those skilled in the art overcome by the outdoor nonwoven fabric of the present invention which in one aspect comprises a first outer layer of bicomponent fibers having a sheath/core configuration wherein the sheath component comprises a UV stable polymer and a water impermeable barrier layer. The invention may further include a second outer layer wherein the barrier layer is positioned between the first and second outer layers. In addition, the first outer layer may comprise bicomponent fibers having a sheath/core configuration wherein the sheath component comprises a thermoplastic hindered amine stabilized saturated polyolefin. Further, the sheath/core configuration of the first outer layer may, in one aspect, comprise a UV stabilized polyethylene sheath and a UV stabilized polypropylene core. In still a further aspect of the invention the second outer layer may comprise a durable support layer such as a layer of bicomponent sheath/core fibers having a UV stabilized polyethylene sheath and a nylon core. In a further aspect of the invention the barrier layer may comprise a breathable film. In a further aspect of the invention the polymer comprising the sheath component of the first and second layers and the barrier layer may be similar or identical polymers.

In still a further aspect of the present invention, the outdoor fabric may comprise a first outer layer of UV stable fibers and a barrier layer comprising a water impervious breathable microporous film. The barrier film may, for example, comprise a UV stabilized stretched-filled polyolefin film. The invention may further include a second outer layer wherein the barrier layer is positioned between the first and second outer layers. In addition, the first outer layer may comprise bicomponent fibers having a sheath/core configuration wherein the sheath component comprises a thermoplastic polymer with UV stability superior to that of the core component. Further, the sheath/core configuration of the first outer layer may, in one aspect, comprise a UV stabilized polyethylene sheath and a UV stabilized polypropylene core. In still a further aspect of the invention the second outer layer may comprise a durable support layer such as a layer of bicomponent sheath/core fibers having a UV stabilized polyethylene sheath and a nylon core. The sheath component of the first and second outer layers and the barrier layer may each comprise similar or identical polymers.

DEFINITIONS

As used herein, the term "water impermeable" or "water impervious" refers to a material which does not allow water in the liquid state to readily pass therethrough having a minimum hydrohead value of at least about 30 mbar. Hydrohead as used herein refers to a measure of the liquid barrier properties of a fabric. A fabric with a higher hydrohead reading indicates it has a greater barrier to liquid penetration than a fabric with a lower hydrohead.

As used herein the term "UV stable" refers to a polymeric composition which retains at least 40% (corrected) of its tensile strength after 12 months of exposure. UV stability may be assessed by a South Florida test which may be conducted by exposing a nonwoven fabrics to the sun with no backing in Miami, Fla. The samples face south at a 45 degree angle. Each cycle concludes with a modified tensile test to measure the degradation or change in strength of the fabric. This provides a measure of the durability of the fabric. The relative UV stability can be assessed by comparing the length of time the web retains at least 40% (corrected) of its tensile strength. The tensile strength of a fabric may be measured according to the ASTM test D-1682-64. In addition, calculation of corrected 40% tensile strength may be obtained by adding the sum of the months to 50, 40 and 30% retention of tensile strength and dividing by three.

As used herein, the term "breathable" refers to a material which is permeable to water vapor having a minimum MVTR of at least about 100 g/m$^2$/24 hours. The MVTR of a fabric is also often generally referred to as the water vapor transmission rate (WVTR).

As used herein the term "nonwoven fabric" or "nonwoven web" refers to a web having a structure of individual fibers or threads which are interlaid, but not in an identifiable manner as in a knitted fabric. Nonwoven fabrics or webs have been formed from many processes such as for example, meltblowing processes, spunbonding processes, hydroentangling and bonded carded web processes.

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al.; U.S. Pat. No. 3,692,618 to Dorschner et al.; U.S. Pat. No. 3,802,817 to Matsuki et al.; U.S. Pat. Nos. 3,338,992 and 3,341,394 to Kinney; U.S. Pat. No. 3,502,763 to Hartman; U.S. Pat. No. 3,542,615 to Dobo et al.; U.S. Pat. No. 5,382,400 to Pike et al. and U.S. Pat. No. 5,534,339 to Stokes; the entire contents of which are incorporated herein by reference. Spunbond fibers are generally not tacky when they are deposited onto a collecting surface. Spunbond fibers are generally continuous and typically have average diameters (from a sample of at least 10) larger than about 7 microns, often between about 10 and 30 microns.

As used herein the term "meltblown fibers" refers to fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are typically carried by the high velocity gas stream and are deposited on a collecting surface to form a web of randomly disbursed meltblown fibers. Such a process is disclosed, for example, in U.S. Pat. No. 3,849,241 to Butin et al. Meltblown fibers are microfibers which may be continuous or discontinuous, are generally smaller than 10 microns in average diameter, and are generally tacky when deposited onto a collecting surface.

As used herein the term "fibers", except as noted otherwise, includes discontinuous strands having a definite length, such as staple length fibers, and also includes filaments which are continuous strands of material.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical or spacial configurations of the molecule. These configurations include, but are not limited to isotactic, syndiotactic and random symmetries.

As used herein the term "multicomponent fibers" refers to fibers which have been formed from at least two polymers. Such fibers are typically extruded from separate extruders but spun together to form one fiber. Multicomponent fibers include conjugate and/or bicomponent fibers. The polymers are usually different from each other though conjugate fibers may have components comprising either similar or identical polymers. The polymers are arranged in substantially constantly positioned distinct zones across the cross-section of the multicomponent fibers and extend continuously along the length of the multicomponent fibers. Multicomponent fibers are taught in U.S. Pat. No. 5,108,820 to Kaneko et al., U.S. Pat. No. 4,795,668 to Krueger et al., U.S. Pat. No. 5,336,552 to Strack et al and U.S. Pat. No. 5,382,400 to Pike et al., the entire contents of which are incorporated herein by reference. For bicomponent fibers, the polymers may be present in ratios (by volume) of $75/25$, $50/50$, $25/75$ or other desired ratios. Multicomponent fibers may also have various shapes such as, for example, those described in U.S. Pat. Nos. 5,277,976 to Hogle et al., U.S. Pat. Nos. 5,466,410 to Hills and 5,069,970 and 5,057,368 to Largman et al.

As used herein, the term "hot air knife" or "HAK" refers a process of bonding a layer of fibers, particularly spunbond, in order to give it sufficient integrity, i.e. increase the stiffness of the web, for further processing, but does not mean the relatively stronger bonding processes like TAB, thermal bonding and ultrasonic bonding. A hot air knife is a device which focuses a stream of heated air at a very high flow rate, generally from about 1000 to about 10000 feet per minute (fpm) (305 to 3050 meters per minute), or more particularly from about 3000 to 5000 feet per minute (915 to 1525 m/min.) directed at the nonwoven web soon after its formation. The air temperature is usually in the range of the melting point of at least one of the polymers used in the web, generally between about 200 and 550° F. (93 and 290° C.) for the thermoplastic polymers commonly used in spunbonding. The control of air temperature, velocity, pressure, volume and other factors helps avoid damage to the web while increasing its integrity. The HAK's focused stream of air is arranged and directed by at least one slot of about ⅛ to 1 inches (3 to 25 mm) in width, particularly about ⅜ inch (9.4 mm), serving as the exit for the heated air towards the web, with the slot running in a substantially cross-machine direction over substantially the entire width of the web. In other embodiments, there may be a plurality of slots arranged next to each other or separated by a slight gap. The slot is usually, though not essentially, continuous, and may be comprised of, for example, closely spaced holes. The HAK may have a plenum to distribute and contain the heated air prior to its exiting the slot. The plenum pressure of the HAK is usually between about 1.0 and 12.0 inches of water (2 to 22 mmHg), and the HAK is positioned between about 0.25 and 10 inches and more preferably 0.75 to 3.0 inches (19 to 76 mm) above the forming wire. In a particular embodiment the HAK plenum's cross sectional area for cross-directional flow (i.e. the plenum cross sectional area in the machine direction) is at least twice the total slot exit area. Since the foraminous wire onto which spunbond polymer is formed generally moves at a high rate of speed, the time of exposure of any particular part of the web to the air discharged from the hot air knife is often less a tenth of a second and frequently about a hundredth of a second in contrast with the through air bonding process which has a much larger dwell time. The HAK process has a great range of variability and controllability of many factors such as air temperature, velocity, pressure, volume, slot or hole arrangement and size, and the distance from the HAK plenum to the web. The HAK is further described in U.S. Patent application Ser. No. 08/362,328 to Arnold et al., filed Dec. 22, 1994 and commonly assigned, the entire contents of which are incorporated herein by reference.

As used herein, "through-air bonding" or "TAB" refers to a process of bonding a nonwoven conjugate fiber web in which heated air, which is sufficiently hot to melt one of the polymers of the multicomponent fibers, is forced through the web. The melting and resolidification of the polymer provides the bonding between the fibers to integrate the web. The air velocity is typically between 100 and 500 feet per minute and the dwell time may be as long as 6 seconds. Through air bonding has relatively restricted variability and since through-air bonding TAB requires the melting of at least one component to accomplish bonding, it is particularly useful in connection with webs of conjugate fibers or those which include an adhesive. In the through-air bonder, air having a temperature above the melting temperature of at least one of the exposed components is directed through the web and into a perforated roller supporting the web. Alternatively, the through-air bonder may be a flat arrangement wherein the air is directed vertically downward onto the web. The operating conditions of the two configurations are similar, the primary difference being the geometry of the web during bonding.

As used herein, "ultrasonic bonding" means a process performed, for example, by passing the fabric between a sonic horn and anvil roll as illustrated in U.S. Pat. No. 4,374,888 to Bornslaeger, the entire contents of which is incorporated herein by reference.

As used herein "point bonding" means bonding one or more layers of fabric at a plurality of discrete bond points. For example, thermal point bonding generally involves passing a fabric or web of fibers to be bonded between a heated roll assembly such as, for example, a heated calender roll and an anvil roll. The calender roll is usually patterned in some way so that the entire fabric is not bonded across its entire surface, and the anvil roll is usually flat. As a result, various patterns for calender rolls have been developed for functional and/or aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern when new has a bonded area of about 29.5%. Another typical point bonding pattern is the expanded Hansen Pennings or "EHP" bond pattern which produces a 15% bond area when new with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15% when new. Other common patterns include a diamond pattern with repeating and slightly offset diamonds with about a 16% bond area when new. Further, a wire weave pattern, which gives the nonwoven web a woven look, having a pin density of about 302 pins per square inch and resulting in a bonded area of about 17% when new. Typically, the percent bonding area varies from around 5% to around 30% of the area of the fabric laminate web. Spot bonding holds the laminate layers together as well as imparts integrity to each individual layer by bonding filaments and/or fibers within each layer without destroying the breathability of the fabric.

As used herein, the term "outdoor fabric" means a fabric which is primarily, though not exclusively, used outdoors. Outdoor fabric includes fabric used in protective covers, camper/trailer fabric, tarpaulins, awnings, canopies, tents, agricultural fabrics and outdoor apparel such as head coverings, industrial work wear and coveralls, pants, shirts, jackets, gloves, socks, shoe coverings, and the like.

As used herein the term "protective cover" refers to a cover for vehicles such as cars, trucks, boats, airplanes, motorcycles, bicycles, golf carts, etc., covers for equipment often left outdoors like grills, yard and garden equipment (mowers, roto-tillers, etc.) and lawn furniture, as well as floor coverings, table cloths and picnic area covers.

DESCRIPTION OF THE PREFERRED EMBODIMENTS

Figure 1:
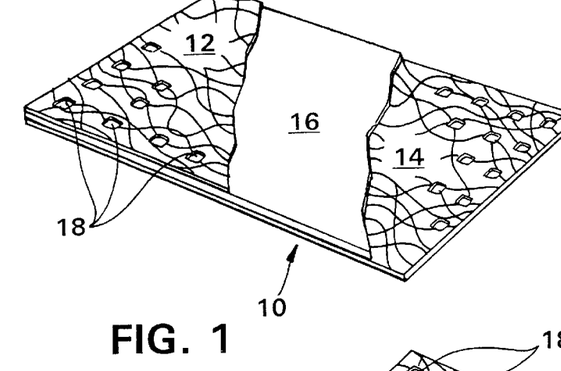
FIG. 1 is a partially cut-away perspective view of a multilayer laminate of the present invention.

In reference to FIG. 1, outdoor fabrics of the present invention will be described in further detail. As illustrated, laminate 10 may comprise first outer layer 12, second outer layer 14, and barrier layer 16 positioned between first outer layer 12 and second outer layer 14. First outer layer 12 is adapted to provide the desired UV resistance, barrier layer 16 is adapted to provide a water-impervious barrier and second outer layer 14 adapted to provide additional strength and support to barrier layer 16 and laminate 10. Thus, laminate 10 may be used, for example, as a protective cover for an automobile by placing laminate 10 over the automobile such that second outer layer 14 faces the automobile (not shown) and first outer layer 12 faces the environment.

First outer layer 12 comprises an integrated layer of UV stable fibers, desirably an integrated nonwoven web of continuous fibers. In a preferred embodiment, referring to FIG. 2, the fibers comprise sheath/core type multicomponent fibers having a first component A which envelops second component B and forms a peripheral surface along substantially the entire length of multicomponent fibers may be eccentric or concentric and it is desirable that the fibers comprise continuous filaments in which the enveloping component A forms the entire peripheral surface along the length of fiber 20 thereby minimizing the UV impact on component B. Similarly, although the multicomponent fibers may be eccentric or concentric in configuration, concentric bicomponent fibers are preferred. As the orientation of the core component within the fiber may vary in many production methods, in order to ensure sufficient protection of the core component it is desirable that the sheath component comprise at least about 50% of the cross-sectional surface area of the fiber. Component A of the multicomponent fibers comprises a UV stable polymer and the desired UV stability may be achieved by selecting a polymeric composition inherently having good UV stability and/or by adding one or more UV stabilizers to the polymeric composition.

Figure 2:
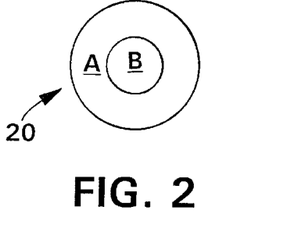
FIG. 2 is a cross-sectional view of a concentric sheath/core bicomponent fiber of the present invention.

Numerous UV stabilizers are known in the art which may be added to the polymeric composition of component A in order to achieve the desired UV stability. Examples of such stabilizers include, but are not limited to the following: 2-hydroxybenzophenones; 2-hydroxybenzotriazoles; hydroxybenzoates; metal chelate stabilizers; and hindered amine light stabilizers. An example of hydroxybenzoate stabilizers is 2,4-di-t-butylphenyl ester and those described in U.S. Pat. No. 3,206,431. Metal chelate stabilizers are also known in the art and primarily include nickel complexes. Desirably, stabilizers used in the present invention are hindered amine light stabilizers which refer to a class of stabilizers including a cyclic amine moiety having no hydrogen atoms adjacent the nitrogen atom. Hindered amines are discussed in U.S. Pat. No. 5,200,443 to Hudson and numerous examples of such amines are commercially available, examples including those under the trade name HOSTAVIN N30 from Hoescht Celanese Corporation; CYASORB UV-3346 from Cytec Industries of West Patterson, N.J.; UVASIL-299 from Great Lakes Chemical Company of West Lafayette, Ind. and UVINOL 4049 from BASF. Particularly well suited hindered amines for use in the present invention are commercially available under the trade name CHIMASSORB 944 and CHIMASSORB 119 from the Ciba-Geigy Corporation of Hawthorne, N.Y. Typically the UV stabilizers are added to the polymeric composition prior to melt-spinning such as, for example, by incorporating the stabilizer in polymeric pellets used to produce the extrudate whereby each of the resulting conjugate fiber components has the desired amounts of UV stabilizer. It should be noted that hindered amine stabilizers having molecular weights above 1000, desirable between about 1000 and 5000, typically provide improved stabilization as compared to similar lower molecular weight stabilizers. Desirably the amount of hindered amine within the polymeric composition is between about 0.5% and about 3% by weight. However, the manner and amount of UV stabilizer added to the polymeric compositions will naturally vary with the particular polymer formulation and UV stabilizer selected.

Suitable materials for component A include, but are not limited to, polyolefins, polyamides and polyesters. Desirably component A comprises saturated polyolefins and blends thereof stabilized with hindered amine light stabilizers. Preferably polymers such as polyethylene, linear low density polyethylene, high density polyethylene, polypropylene and blends and/or copolymers thereof are utilized and incorporate hindered amine light stabilizers. A preferred embodiment of component A comprises polyethylene having about 1.25% by weight CHIMASSORB 119 UV stabilizer from Ciba-Geigy and about 1% by weight gray pigment. CHIMASSORB 119 is a monomeric hindered amine stabilizer having the following chemical structure:

where R is (CAS Registry No. 106990-43-6.)

In addition, pigments may also be added to the polymeric composition of component A in order to improve UV stability and/or to improve aesthetics of the resulting product. The choice of pigments may be selected for aesthetic and/or functional considerations. However, it will be appreciated that even simple organic pigments can have an adverse effect on UV stability. In this regard it may be advantageous to employ pigments which further enhance UV stability such as, for example, the use of metal oxide pigments in conjunction with hindered amine stabilizers; see U.S. Pat. No. 5,200,443 to Hudson and U.S. Patent application Ser. No. 08/257,248 filed Jun. 8, 1994, now abandoned, the entire contents of which are incorporated herein by reference. In addition, other stabilization packages and/or methods of improving the UV stability may be used in connection with the present invention; as further examples see U.S. Patent application Ser. No. 08/673,606 filed Jun. 25, 1996 and Ser. No. 08/562,722 filed Nov. 27, 1995, now U.S. Pat. No. 5,707,468 the entire contents of which are incorporated herein by reference. Further, the UV stability of the first outer layer 12 may further be enhanced by applying a UV protective coating upon its exposed surface; see for example U.S. Pat. No. 4,818,600 and World Publication No. 96/25548 to DeLucia et al., the entire contents of the aforesaid references are incorporated herein by reference.

Component B of the multicomponent fibers may comprise a structural component and desirably has good tensile strength. In addition, it is important to note that since first outer layer 12 will often experience extended exposure to direct sunlight, UV radiation will penetrate into multicomponent fiber 20 and impact component B. Thus, it may often be desirable that component B comprise a UV stable polymeric composition. However, since component B is enveloped by component A the degree of UV radiation impacting component B is significantly reduced and it will typically be desirable that component A comprise a material having superior UV stability relative to that of component B. Due to the decreased UV impact on component B of conjugate fiber 20 it is believed possible to use a wider range of polymeric materials and/or UV stabilizers in the outdoor fabric of the present invention while achieving good UV stability. In addition, due to the lessened functional requirements on component B a less expensive polymeric composition may be used such as for example, one using less UV stabilizer and/or a polymer with less inherent UV stability. Suitable materials for component B include polyolefins, polyamides, and polyesters which desirably include some amount of UV stabilizers. Optionally the polymeric composition of component B may also include pigments and other additives as desired. A preferred embodiment of component B comprises polypropylene having about 1.25% by weight CHIMASSORB 944 UV stabilizer from Ciba-Geigy.

Together components A and B comprise multicomponent fiber 20. Although not shown, multicomponent fiber 20 need not be limited to two components. In addition, the multicomponent fiber may comprise identical or similar polymers with varied amounts or types of UV stabilizer. Multicomponent fibers 20 preferably form first outer layer 12 of the laminate 10. First outer layer 12 may comprise a woven fabric or a nonwoven web. Desirably multicomponent fibers 20 comprise an integrated nonwoven web of continuous spunbond fibers. As indicated above, spunbond fibers are generally not tacky when laid on a surface to form a web. It is usually necessary to impart additional integrity to the web by one or more means known in the art such as, for example, by point bonding, through-air bonding, HAK, hydroentangling, needle punching and/or adhesive bonding. Desirably the integrity is imparted to the web of spunbond fibers by thermal point bonding such as described in U.S. Pat. No. 3,855,046 to Hansen et al., the entire contents of which are incorporated herein by reference. In reference to FIG. 1, point bonds 18 create interfiber bonds between the spunbond fibers and impart integrity to the first outer layer 12. Desirably the first outer layer comprises a material having a basis weight between about 1 and about 4 osy (ounces per square yard) and, more desirably, between about 1.5 osy to about 3.5 osy. In a preferred embodiment of the present invention, first outer layer 12 comprises a 2.5 osy point bonded web of $^{50}/_{50}$ sheath/core spunbonded fibers or two layers of 1.25 osy point bonded webs of $^{50}/_{50}$ sheath/core spunbonded fibers. However, first outer layer 12 may alternatively comprise a woven web, knitted fabric, spunlaced material, bonded carded webs, needle punched material, and/or similar fabric.

Figure 3:
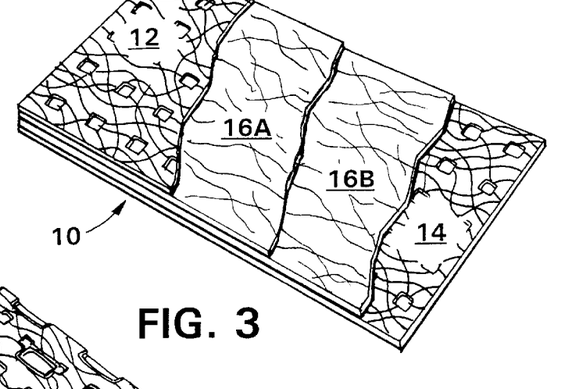
FIG. 3 is a partially cut-away perspective view of an alternative embodiment of a multilayer laminate of the present invention.

Positioned between first outer layer 12 and second outer layer 14 is barrier layer 16 which comprises a water impervious layer. Preferably barrier layer 16 has a hydrohead value in excess of about 30 mbar and more preferable at least about 80 mbar. Desirably barrier layer 16 is also breathable, that is barrier layer 16 allows water vapor to pass or migrate therethrough. In this regard barrier layer 16 preferably has an MVTR of at least about 100 g/m$^2$/day and even more preferably at least about 300 g/m$^2$/day or 800 g/m$^2$/day. Although the extent of the UV radiation will be significantly reduced by overlying first outer layer 12 it is important to note that UV radiation will often penetrate first outer layer 12 and impact barrier layer 16. It will therefore often be desirable to add UV stabilizers to and/or select an inherently UV stable material for barrier layer 16. In addition, heat stabilizers, pigments and other additives may likewise be added to barrier layer 16 as desired. Numerous materials are available which may comprise barrier layer 16 such as, for example, films, foams, non-porous films, micro-porous films and micro-porous nonwoven materials. Most non-porous films act as a complete barrier to the passage of water and, thus, will create a non-breathable laminate. However, certain non-porous films, such as certain polyurethane films, act a barrier to water in the liquid state yet allow water vapor to migrate therethrough. In addition, many meltblown webs having a basis weight of at least 0.3 osy exhibit the desired barrier properties and yet are breathable due to the porous structure of meltblown webs. Desirably such meltblown webs used in the present invention have a basis weight between about 0.3 and about 1.5 osy. In reference to FIG. 3, the barrier layer 16 may comprise multiple layers 16$a$ and 16$b$, such as two layers of meltblown webs.

Films which are rendered breathable, but which remain liquid-impervious, by the formation of microporous voids or openings sized to allow the transmission of water vapor therethrough are likewise known in the art. Laminates 10 incorporating the latter type of breathable films are generally preferred. These firms may be rendered vapor permeable by adding filler particles to the film composition and either rolling or stretching the film causing fractures to form where the filler particles are located. The amount of filler within the film and the degree of stretching and/or rolling is controlled to impart the desired degree of vapor permeability. Use of such films in connection with the present invention allows for an outdoor fabric having an MVTR of at least about 100 g/m$^2$/24 hours and yet with a hydrostatic head of at least about 100 mbar. These film are typically formed from a polyolefin film, such as a polyethylene or polypropylene. Microporous breathable liquid-impervious films are discussed at greater length as disclosed in U.S. Pat. No. 4,777,073 issued to Sheth and U.S. Patent application Ser. No. 08/755,664 filed Nov. 25, 1996 to McCormack; U.S. Patent application Ser. No. 08/882,712 filed Jun. 25, 1997 to McCormack et al.; and U.S. Patent application filed on Sep. 15, 1997, Express Mail No. RB879662575US, the entire contents of which are incorporated herein by reference. Additional breathable films and laminates with the requisite barrier properties may also be used in connection with the present invention; see for example U.S. Pat. Nos. 3,953,566 and 4,194,041. A particularly desirable material for use in the present invention is a biaxially oriented linear low density polyethylene (LLDPE) film material which is about 50% to about 70% by weight calcium carbonate and which is commercially available from Exxon Chemical Patents, Inc. of Linden, N.J. under the trade name EXXAIRE. In a preferred embodiment barrier layer 16 comprises a microporous polyolefin film from about 0.5 to about 2 mils thickness and which further includes UV stabilizers. For example, barrier layer 16 may comprise a 1 mil microporous linear low density polyethylene (LLDPE) film having about 1.5% by weight CHIMASSORB 944 UV stabilizer from Ciba-Geigy which was filled with about 50% by weight CaCO$_3$ and stretched in both the machine and cross-machine directions.

The outdoor fabric 10 may, optionally, include a further layer whereby the liquid impervious barrier 16 is positioned between first outer layer 12 and second outer layer 14. Second outer layer 14 preferably comprises a material having good strength and abrasion resistance and which is capable of being attached to the other layers. Second outer layer 14 may comprise a woven web, knitted fabric, spunlaced material, bonded carded webs, needle punched material or spunbond nonwoven web with the desired strength and abrasion characteristics. With many applications of the fabric, such as a protective car cover, it will also be desirable that the second outer layer be hydrophobic so as to prevent water from being held therein. In this regard it will be appreciated that most polyofefins are inherently hydrophobic. In addition, UV radiation will also penetrate into the second outer layer, albeit considerably less than that experienced by the sheath component of first outer layer 12. Thus, depending upon the material selected to comprise second outer layer 14 it will often be desirable to add UV stabilizers thereto. In a preferred embodiment the second outer layer 14 may comprise a layer similar to first outer layer 12. In one aspect, second outer layer 14 may comprise a layer of sheath/core spunbond fibers such as, for example, a continuous 50/50 sheath/core fibers wherein the sheath component comprises polyethylene with 1.25% CHIMASSORB 119 UV stabilizer and 1% gray pigment and the core component nylon-6. Although nylon has a relatively poor degree of UV stability, due to the decreased levels of UV radiation impacting second outer layer 14 it will often be unnecessary to include UV stabilizer in the core component even when using such materials. However, in a preferred embodiment about 1.25% by weight of CHIMASSORB 944 UV stabilizer may be included in the nylon component. The second outer layer 14 desirably has a basis weight of about 0.75 to about 2.5 and, more preferably, from about 1.0 to about 2.0 osy. In addition, heat stabilizers, pigments and other additives may also be included within the polymer formulations as desired.

Figure 4:
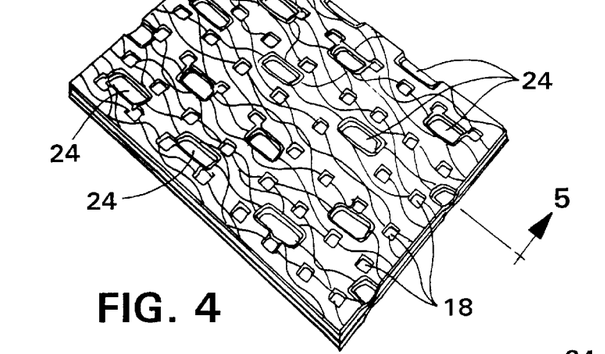
FIG. 4 is a perspective view of the laminate of FIG. 1 illustrating a representative bond pattern.
Figure 5:
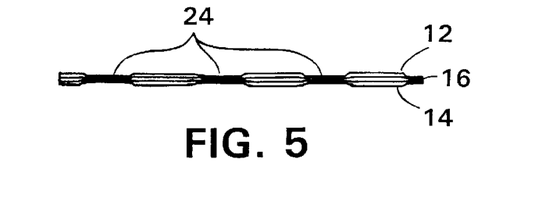
FIG. 5 is a cross-sectional view of the laminate of FIG. 4 taken along lines 5—5.
Figure 6:
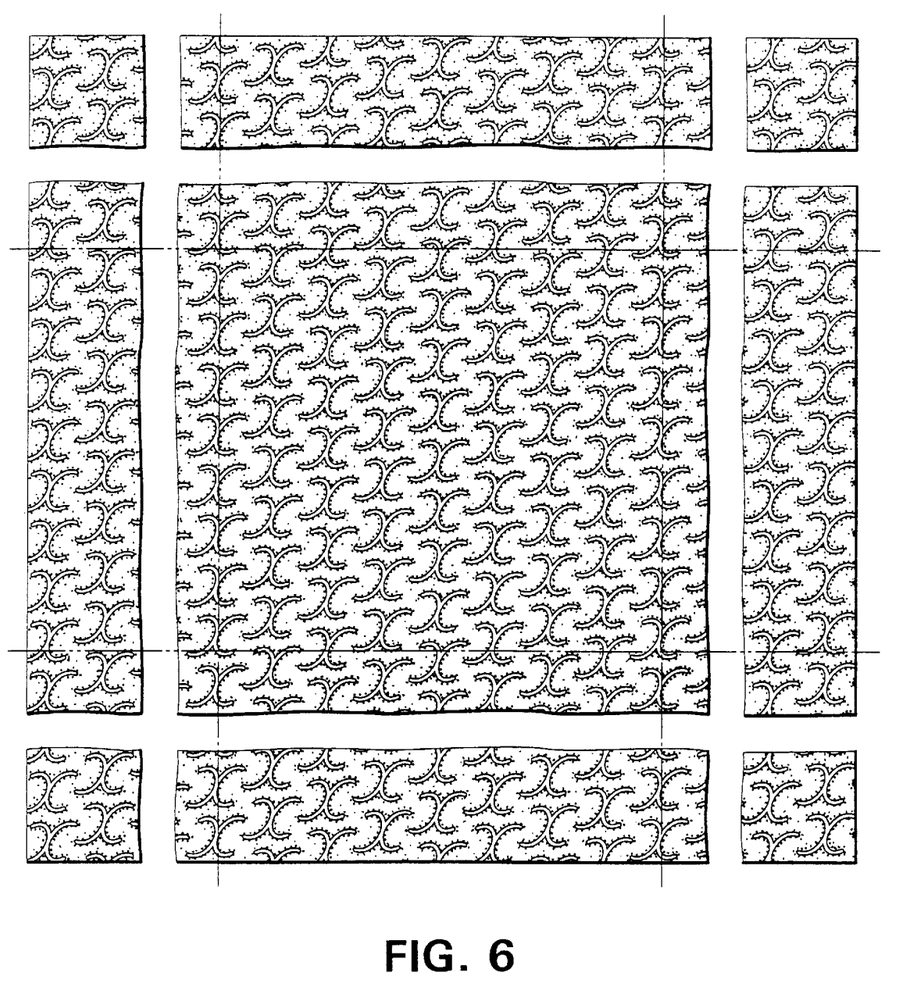
FIG. 6 is a schematic view of a representative bond pattern.

First outer layer 12, barrier layer 16 and second outer layer 14 collectively comprise laminate 10. Although the present description primarily discusses the use of three layers it will be appreciated by those skilled in the art that additional outer layers and/or inter-layers may be used in connection with the laminates discussed herein. Additional layers may be employed to increase the tensile strength, peel strength, barrier properties or other characteristics as desired. The multiple layers are laminated together to form a single cohesive fabric. Adhesion between the multiple layers may be achieved by various means known in the art such as, for example, ultrasonic bonding, thermal point bonding and/or adhesive bonding. However, thermal point bonding and/or ultrasonic bonding are preferred since often adhesives will degrade or react with the components upon extended UV exposure. In addition, where the collective basis weight of the individual layers exceeds 3.0 osy it will further be desirable to laminate the materials using ultrasonic bonding since at these higher basis weights thermal point bonded laminates may experience delamination due to poor peel strength. In reference to FIG. 4, bond points 24 are created, such as by application of thermal or ultrasonical energy, by melting the polymer compositions having a lower melting point. Desirably bonding is achieved by heating regions of the laminate above the melting point of the materials comprising the sheath component of the fibers comprising first outer layer 12 and second outer layer 14. Depending on the composition of the barrier layer, upon application of sufficient energy and pressure softening and/or melting of the polymer composition in the barrier material may also be achieved. In the particular embodiment of FIG. 4, bond points 24 comprise a pattern of ultrasonic spot bonds. Typically the bond points themselves form non-breathable areas within the film. Thus, when employing breathable barrier layers it is preferred that the bond area is less than about 50% of the surface area of the laminate and, more desirably, from about 5 to about 30% of the surface area. An exemplary ultrasonic bonding pattern is shown in FIG. 6 which creates a bond area of about 10–20%, preferably about 18%. However, numerous other bond patterns, such as those discussed above in the definitions section regarding thermal point bonding, may likewise be used in connection with the present invention.

The laminate of the present invention allows for the use of a wider array of materials while providing a UV stable laminate. Moreover, the present invention provides a cohesive material with excellent attributes, such as a desired combination of high water barrier properties, good breathability and high tensile strength. By selecting polymers in the respective sheath components and film which have similar or identical melting points, thermal and/or ultrasonic bonding of the multiple layers will produce improved and well defined bond areas between both the sheath component of the outer layers and the barrier layer. For example, the sheath components and barrier layer may each comprise similar polymers such as for example, various polyethylene compositions and/or blends having similar melting points. In addition, it is believed that the present invention provides an improved laminate having a superior combination of UV stability and strength retention.

Figure 7:
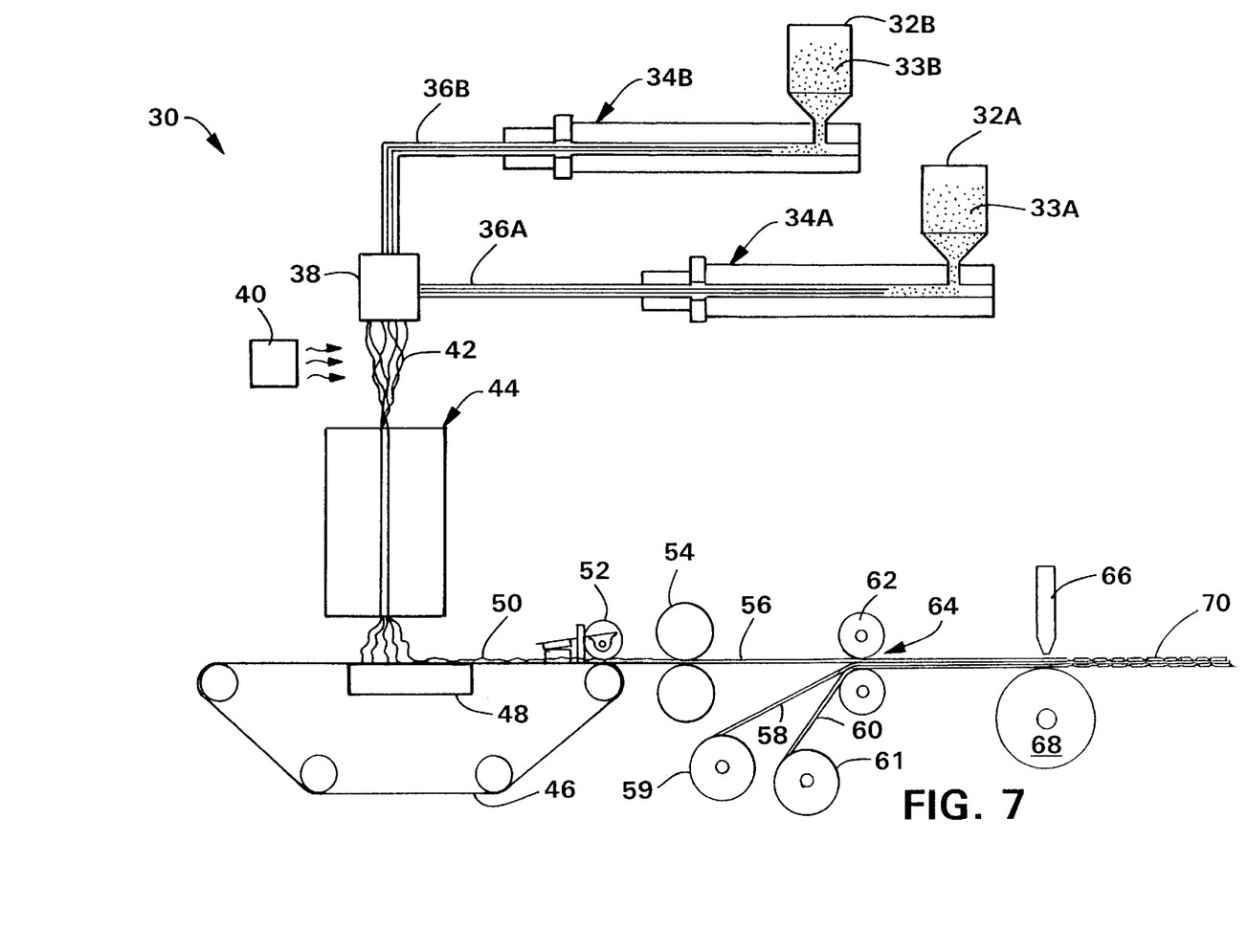
FIG. 7 is a schematic view of a process line for making the fabric of the present invention.

In reference to FIG. 7, a process line 30 for fabricating a laminate of the present invention is disclosed. Hoppers 32a and 32b may be filled with the respective polymeric components 33a and 33b. The polymeric components are then melted and extruded by the respective extruders 34a and 34b through polymer conduits 36a and 36b and through spinneret 38. Spinnerets are well known to those skilled in the art and, generally, include a housing containing a spin pack which includes a plurality of plates stacked one on top of the another with a pattern of openings arranged to create flow paths for directing the polymeric components as desired. As the extruded filaments extend below spinneret 38, a stream of air from quench blower 40 quenches bicomponent filaments 42. The filaments 42 are drawn into a fiber draw unit or aspirator 44 and then onto traveling foraminous surface 46, with the aid of vacuum 48, to form an unbonded layer of bicomponent spunbond fibers 50. The unbonded bicomponent fiber layer 50 may be lightly compressed by compression rollers 52 and then thermal point bonded by patterned bonder-roller assembly 54 thereby creating first layer 56 of bonded bicomponent spunbond fibers. Those skilled in the art will appreciate that the spunbonded web could be made previously and wound on a supply roll and fed into the present process. Barrier fabric 58 and second layer 60 of bicomponent bonded spunbond material may each be unrolled from respective supply rolls 59 and 61 and superposed with the first layer 56 such that the barrier fabric 58 is positioned between the two spunbond layers 56 and 60. The three layers 56, 58 and 60 may be fed through nip 64 of guide-roll assembly 62. The multiple superposed materials are then passed between a sonic horn 66 and patterned anvil 68 to ultrasonically bond the material forming cohesive laminate 70. Preferably the thicker layer, typically the first outer layer 12, is facing the ultrasonic horn in order to provide more protection for the barrier layer 16. The laminate 70 may then be wound on a winder roll (not shown) or, alternatively, be cut to the desired dimensions and/or directly incorporated into a product as desired.

The laminate of the present invention may be shaped and sized in accord for its intended application. For example, it is known in the art to provide protective covers which are specifically fabricated to fit snugly about the article sought to be protected. In this regard many protective covers for automobiles are designed specifically for certain cars, trucks or vans. Further, it is also known in the art to provide an outdoor fabric, such as protective fabrics, comprising more than one type of fabric to provide areas with different functional properties. In particular, it is known to provide a protective fabric with a breathable portion and a non-breathable portion. The non-breathable areas typically provide greater liquid barrier properties and thus are designed to be position on top of the article when in place and the breathable sections designed to be positioned in those areas less susceptible to leakage during intense precipitation, such as the sides. Although such configurations may be used in connection with the present invention they need not be due to the excellent combination of breathability and liquid barrier properties provided by the present invention.

TEST PROCEDURES

Hydrohead: This test measures the liquid barrier properties of a fabric. The hydrohead test determines the height of water or amount of water pressure (in millibars) that the fabric will support before liquid passes therethrough. A fabric with a higher hydrohead reading indicates it has a greater barrier to liquid penetration than a fabric with a lower hydrohead. The hydrohead can be performed according to Federal Test Standard 191A, Method 5514. The hydrohead data cited herein was obtained using a test similar to the aforesaid Federal Test Standard except modified as noted below. The hydrohead was determined using a hydrostatic head tester available from Mario Enterprises, Inc. of Concord, N.C. The specimen is subjected to a standardized water pressure, increased at a constant rate until the first sign of leakage appears on the surface of the fabric in three separate areas. (Leakage at the edge, adjacent clamps is ignored.) Unsupported fabrics, such as a thin film, can be supported to prevent premature rupture of the specimen.

The water vapor transmission rate (WVTR) or moisture vapor transmission rate (MVTR) for the sample materials was calculated in accordance with ASTM Standard E96-80. Circular samples measuring three inches in diameter were cut from each of the test materials and a control which was a piece of CELGARD™ 2500 film from Hoechst Celanese Corporation of Sommerville, N.J. CELGARD™ 2500 film is a microporous polypropylene film. Three samples were prepared for each material. The test dish was a number 60-1 Vapometer pan distributed by Thwing-Albert Instrument Company of Philadelphia, Pa. One hundred milliliters of water were poured into each Vapometer pan and individual samples of the test materials and control material were placed across the open tops of the individual pans. Screw-on flanges were tightened to form a seal along the edges of the pan, leaving the associated test material or control material exposed to the ambient atmosphere over a 6.5 centimeter diameter circle having an exposed area of approximately 33.17 square centimeters. The pans were placed in a forced air oven at 100° F. (32° C.) or 1 hour to equilibrate. The oven was a constant temperature oven with external air circulating through it to prevent water vapor accumulation inside. A suitable forced air oven is, for example, a Blue M Power-O-Matic 60 oven distributed by Blue M. Electric Company of Blue Island, Ill. Upon completion of the equilibration, the pans were removed from the oven, weighed an immediately returned to the oven. After 24 hours, the pans were removed from the oven and weighed again. The preliminary test water vapor transmission rate values were calculated with Equation (I) below:

$$\text{Test WVTR} = (\text{grams weight loss over 24 hours}) \times 315.5 \text{ g/m}^2/24 \text{ hours} \quad (I)$$

The relative humidity within the oven was not specifically controlled.

Under the predetermined set conditions of 100° F. (32° C.) and ambient relative humidity, the WVTR for the CELGARD™ 2500 control has been defined to be 5000 grams per square meter for 24 hours. Accordingly, the control sample was run with each test and the preliminary test values were corrected to set conditions using Equation (II) below:

$$WVTR = (\text{Test WVTR}/\text{control WVTR}) \times (5000 \text{ g/m}^2/24 \text{ hours}) \quad (II)$$

Mullen Burst: This test measures the resistance of textile fabrics to bursting when subjected to hydraulic pressure. The bursting strength is defined as the hydrostatic pressure required to rupture a fabric by distending it with a force, applied through a rubber diaphragm, at right angles to the plane of the fabric. This method measures the bursting strength of products up to 0.6 mm thick, having a bursting strength between and 200 pounds per square inch. The pressure is generated by forcing a liquid (glycerin) into a chamber at the rate of 95±5 ml/min. The specimen, held between annular claims, is subjected to increasing pressure at a controlled rate until the specimen ruptures. The bursting strength is expressed in pounds. This procedure conforms to TAPPI official standard T-403 os-76, except that specimen size is 5 inches (12.6 cm) square and ten specimens are tested. The test equipment used is a motor driven Mullen bursting strength tester from B. G. Perkins & Son Inc., G. P. O. 366, Chicopee, Mass. 01021 or from Testing Machines Inc., 400 Bayview Ave., Amityville, N.Y. 11701. The sample should be conditioned to ASTM conditions of 65 ±2 percent relative humidity and 72 ±2° F. (22 ±1° C.), or TAPPI conditions of 50 ±2 percent relative humidity and 72 ±1.8° F. prior to testing.

Grab Tensile test: The grab tensile test is a measure of breaking strength and elongation or strain of a fabric when subjected to unidirectional stress. This test is known in the art and conforms to the specifications of Method 5100 of the Federal Test Methods Standard 191A. The results are expressed in pounds or grams to break and percent stretch before breakage. Higher numbers indicate a stronger, more stretchable fabric. The term "load" means the maximum load or force, expressed in units of weight, required to break or rupture the specimen in a tensile test. The term "total energy" means the total energy under a load versus elongation curve as expressed in weight-length units. The term "elongation" means the increase in length of a specimen during a tensile test. The grab tensile test uses two clamps, each having two jaws with each jaw having a facing in contact with the sample. The clamps hold the material in the same plane, usually vertically, separated by 3 inches (76 mm) and move apart at a specified rate of extension. Values for grab tensile strength and grab elongation are obtained using a sample size of 4 inches (102 mm) by 6 inches (152 mm), with a jaw facing size of 1 inch (25 mm) by 1 inch, and a constant rate of extension of 300 mm/min. The sample is wider than the clamp jaws to give results representative of effective strength of fibers in the clamped width combined with additional strength contributed by adjacent fibers in the fabric. The specimen is clamped in, for example, a Sintech 2 tester, available from the Sintech Corporation, 1001 Sheldon Dr., Cary, N.C. 27513, an Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Phila., Pa. 19154. This closely simulates fabric stress conditions in actual use. Results are reported as an average of multiple specimens and may be performed with the specimen in the cross direction (CD) or the machine direction (MD).

Strip Tensile: The strip tensile test is similar to the grab tensile and measures the peak and breaking loads and peak and break percent elongations of a fabric. This test measures the load (strength) in grams and elongation in percent. In the strip tensile test, two clamps, each having two jaws with each jaw having a facing in contact with the sample, hold the material in the same plane, usually vertically, separated by 3 inches and move apart at a specified rate of extension.

Values for strip tensile strength and strip elongation are obtained using a sample size of 3 inches by 6 inches, with a jaw facing size of 1 inch high by 3 inches wide, and a constant rate of extension of 300 mm/min. The Sintech 2 tester, available from the Sintech Corporation, 1001 Sheldon Dr., Cary, N.C. 27513, the Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Phila., Pa. 19154 may be used for this test. Results are reported as an average of multiple specimens and may be performed with the specimen in the cross direction (CD) or the machine direction (MD).

Trap Tear test: The trapezoid or "trap" tear test is a tension test applicable to both woven and nonwoven fabrics. The entire width of the specimen is gripped between clamps, thus the test primarily measures the bonding or interlocking and strength of individual fibers directly in the tensile load, rather than the strength of the composite structure of the fabric as a whole. The procedure is useful in estimating the relative ease of tearing of a fabric. It is particularly useful in the determination of any appreciable difference in strength between the machine and cross direction of the fabric. In conducting the trap tear test, an outline of a trapezoid is drawn on a 3 by 6 inch (75 by 152 mm) specimen with the longer dimension in the direction being tested, and the specimen is cut in the shape of the trapezoid. The trapezoid has a 4 inch (102 mm) side and a 1 inch (25 mm) side which are parallel and which are separated by 3 inches (76 mm). A small preliminary cut of ⅝ inches (15 mm) is made in the middle of the shorter of the parallel sides. The specimen is clamped in, for example, an Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Phila., Pa. 19154, which have 3 inch (76 mm) long parallel clamps. The specimen is clamped along the non-parallel sides of the trapezoid so that the fabric on the longer side is loose and the fabric along the shorter side taut, and with the cut halfway between the clamps. A continuous load is applied on the specimen such that the tear propagates across the specimen width. It should be noted that the longer direction is the direction being tested even though the tear is perpendicular to the length of the specimen. The force required to completely tear the specimen is recorded in pounds with higher numbers indicating a greater resistance to tearing. The test method used conforms to ASTM Standard test D1117-14 except that the tearing load is calculated as the average of the first and highest peaks recorded rather than the lowest and highest peaks. Multiple specimens for each sample should be tested.

South Florida test: This test is conducted by exposing the fabric to the sun with no backing in Miami, Fla. The samples face south at a 45 degree angle. Each cycle concludes with a modified tensile test in pounds to measure the degradation or change in strength of the fabric. This provides a measure of the durability of the fabric.

EXAMPLE 1

A first nonwoven web of continuous $50/50$ sheath/core spunbond fibers was made having a sheath component of linear low density polyethylene (Dow 6811aLLDPE) containing 1.25% hindered amine light stabilizer (CHIMASSORB 119 from Ciba-Geigy) and 1% gray pigment. The pigment comprised titanium dioxide (DuPont R960), Quinacridone Magenta (Sun Chemical 448-0010), Blue/Red shade Phthalo (Sun Chemical 448-0748), and Carbon Black (Cabot Regal 660). The core component of the fiber comprised polypropylene (Exxon 3445) containing about 1.25% hindered amine light stabilizer (CHIMASSORB 944 from Ciba-Geigy). The web of spunbond fibers was then patterned bonded with a wire weave pattern to form an integrated nonwoven web of bicomponent fibers having a basis weight of about 2.5 osy. A second nonwoven web of continuous $50/50$ sheath/core spunbond fibers was made having a sheath component of linear low density polyethylene (Dow 6811aLLDPE) containing 1.25% hindered amine light stabilizer (CHIMASSORB 119 from Ciba-Geigy) and 1% gray pigment. The core component of the fiber comprised nylon-6 (Nyltech 2169) containing about 1.25% hindered amine light stabilizer (CHIMASSORB 944 from Ciba-Geigy). The web of spunbond fibers was then patterned bonded with a wire weave pattern to form an integrated nonwoven web of bicomponent fibers having a basis weight of about 1.2 osy. A barrier layer was superposed between the first and second nonwoven sheets and ultrasonically bonded with the pattern shown in FIG. 6. The barrier layer comprised a 1 mil microporous linear low density polyethylene (LLDPE) film having about 1.5% by weight CHIMASSORB 944 UV stabilizer from Ciba-Geigy and which was filled with about 50% by weight $CaCO_3$ and stretched in both the machine and cross-machine directions. The resulting laminate comprised a 4.6 osy fabric with the following properties: bulk 0.04 inches; hydrohead >200 mbar; WVTR 3465; Mullen Burst 93 psi; Machine Direction (MD) Tensile 114 lbs.; Cross-machine (CD) Direction 81 lbs.; MD Trap 46 lbs.; CD Trap 26 lbs.

While the invention has been described in detail with respect to specific embodiments thereof, it will be apparent to those skilled in the art that various alterations, modifications and other changes may be made without departing from the spirit and scope of the present invention. It is therefore intended that all such modifications, alterations and other changes be encompassed by the claims.

We claim:

1. An outdoor fabric laminate, comprising:
   a first layer of multicomponent fibers having a sheath/core configuration, said sheath component comprising a polyethylene polymer composition and said core component comprising a polypropylene polymer composition;
   a water impermeable barrier layer; and
   a second layer of multicomponent fibers comprising a first polyethylene component and a second polyamide component and wherein said water impermeable barrier layer is positioned between said first and second multicomponent fiber layers.

2. The outdoor fabric of claim 1 wherein said first layer of multicomponent fibers have a sheath/core configuration wherein the ratio of the sheath component to core component is between $75/25$ and $25/75$, by volume.

3. The outdoor fabric of claim 1 wherein said multicomponent fibers have a sheath/core configuration wherein the ratio of the sheath component to core component is about $50/50$, by volume.

4. The outdoor fabric of claim 2 wherein the sheath component of said first layer of multicomponent fibers comprises a polyethylene polymer and a hindered amine stabilizer.

5. The outdoor fabric of claim 4 wherein said second layer of multicomponent fibers have a sheath/core configuration.

6. The outdoor fabric of claim 5 wherein said core component of said second layer of multicomponent fibers comprises nylon.

7. The outdoor fabric of claim 1 wherein said laminate has a pattern of point bonds and a hydrohead of at least 80 mbar.

8. The outdoor fabric of claim 6 wherein said polyethylene polymer composition of said second layer of multicomponent fibers comprises a polyethylene polymer and a hindered amine.

9. The outdoor fabric of claim 1 further comprising a third layer of multicomponent fibers wherein said first and third layers are positioned adjacent one another.

10. The outdoor fabric of claim 9 wherein said third layer of multicomponent fibers comprise sheath/core fibers wherein said sheath component comprises a polyethylene polymer composition.

11. The outdoor fabric of claim 1 wherein said barrier layer comprises a polyolefin meltblown web having a basis weight of at least 0.3 ounces per square yard.

12. The outdoor fabric of claim 1 wherein said barrier layer comprises a breathable film.

13. The outdoor fabric of claim 12 wherein said breathable film comprises a microporous polyolefin film.

14. The outdoor fabric of claim 13 wherein said breathable film comprises a microporous polyethylene film.

15. The outdoor fabric of claim 12 wherein said microporous polyolefin film comprises a multilayer film having an outer polyethylene layer.

16. The outdoor fabric of claim 14 wherein said microporous film comprises a multilayered filled film.

17. The outdoor fabric of claim 12 wherein said breathable film comprises a microporous film comprising at least about 35% by weight filler particles and a polyethylene polymer composition and further wherein said laminate is point bonded.

18. The outdoor fabric of claim 17 wherein the polyethylene polymer composition of said breathable film comprises a polyethylene polymer and between about 0.5 and about 2.0% by weight of a hindered amine stabilizer.

19. The outdoor fabric of claim 13 wherein said first layer of multicomponent fibers has a heavier basis weight than said second multicomponent fiber layer.

20. The outdoor fabric of claim 9 wherein said first and third multicomponent fiber layers have a combined basis weight heavier than the basis weight of said second layer of multicomponent fibers.

21. The outdoor fabric of claim 4 wherein said hindered amine stabilizer comprises 0.5 to about 2.0% by weight of said polyethylene polymer composition and having a formula where R is 22. The outdoor fabric of claim 1 wherein said laminate is ultrasonically bonded.

23. The outdoor fabric of claim 9 wherein said laminate is ultrasonically bonded.

24. The outdoor fabric of claim 17 wherein said laminate is ultrasonically bonded.

* * * * *